United States Patent [19]

Hasquenoph et al.

[11] 4,202,576
[45] May 13, 1980

[54] DEVICE FOR LOCKING TO FIXED SUPPORTS LOADS CARRIED UNDER AIRCRAFT

[75] Inventors: Jean H. Hasquenoph, Lagny; Pierre F. Coutin, Paris, both of France

[73] Assignee: R. Alkan & Cie, France

[21] Appl. No.: 949,484

[22] Filed: Oct. 6, 1978

[30] Foreign Application Priority Data

Dec. 30, 1977 [FR] France ............................. 77 39818

[51] Int. Cl.² ............................................. B64D 1/02
[52] U.S. Cl. ................................ 294/83 R; 89/1.5 G; 244/137 R
[58] Field of Search ............... 294/81 R, 81 SF, 83 R, 294/83 A, 83 AB; 89/1.5 G, 1.5 H; 244/118 R, 137 R

[56] References Cited

U.S. PATENT DOCUMENTS

| | | | |
|---|---|---|---|
| 2,822,207 | 2/1958 | Steinmetz et al. | 244/137 R X |
| 2,963,312 | 12/1960 | Schenk et al. | 294/83 AB |
| 3,056,623 | 10/1962 | Herbert | 294/83 R |
| 3,898,909 | 8/1975 | Craigie | 244/137 R X |
| 4,049,222 | 9/1977 | Peterson | 294/83 A X |

Primary Examiner—Johnny D. Cherry
Attorney, Agent, or Firm—William A. Drucker

[57] ABSTRACT

This device for locking on fixed support loads carried under aircraft comprises, between the suspension rings or saddles of the load and the fixed structure of the aircraft, a pair of spaced pivot pins having fulcrumed thereon a pair of symmetrically opposed bell-crank levers having in turn one arm pivotally connected to a suspension hook and the other arm pivotally connected to a common stretching device, the fulcri of the levers having each also pivoted thereto a radial link having its free end pivoted to a pair of links connected the one to a central rocker and the other to the relevant hook, the rocker being responsive to a detent-positioning device. Due to the provision of adequate extensions of the stretching device and of the hooks, completed by another pair of links, another pair of hooks disposed externally and in coplanar relationship to the first pair may be provided for accommodating indifferently loads having either suspension rings or saddles disposed at one standard distance between centers or other suspension rings or saddles disposed at another standard distance between centers.

3 Claims, 9 Drawing Figures

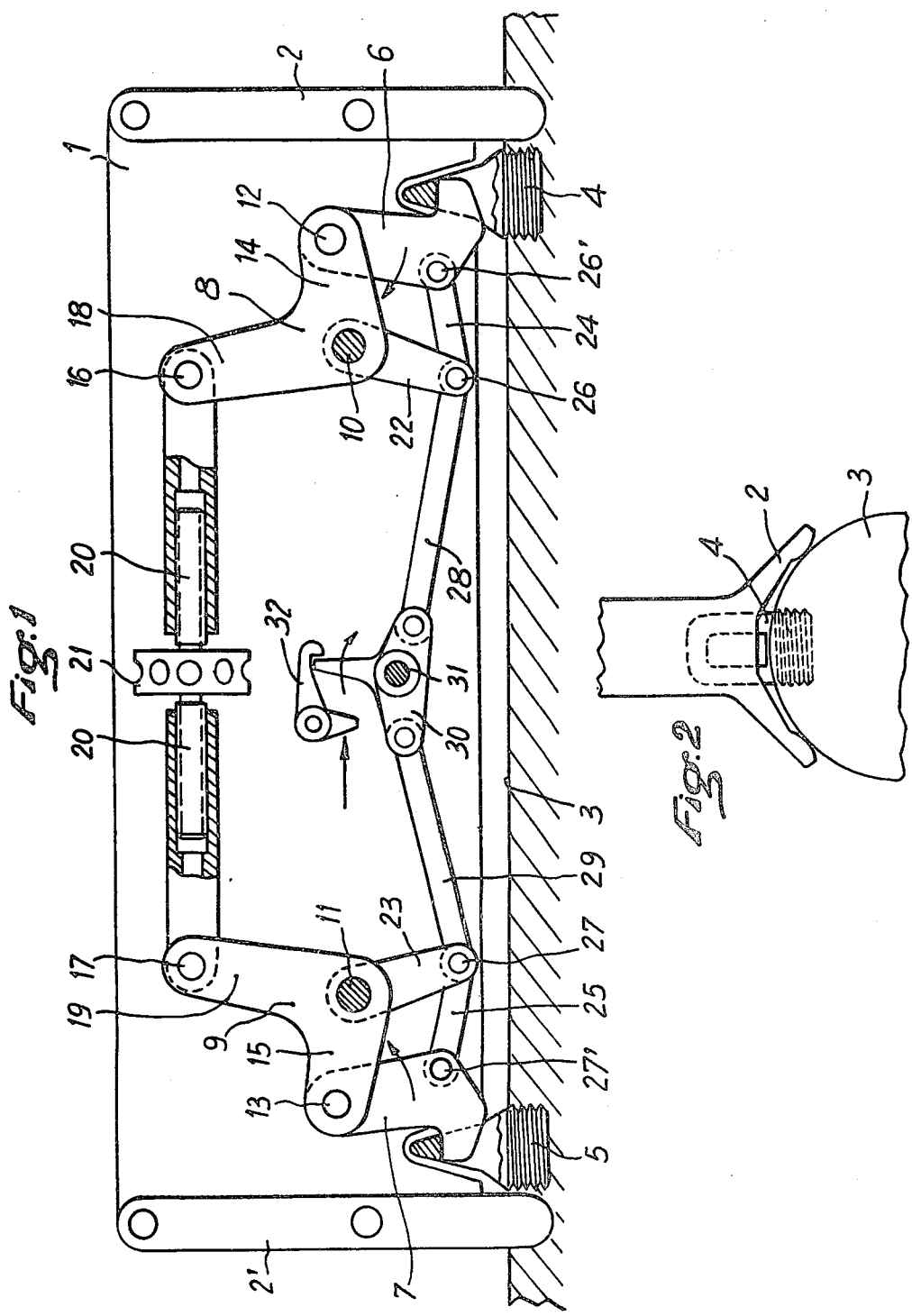

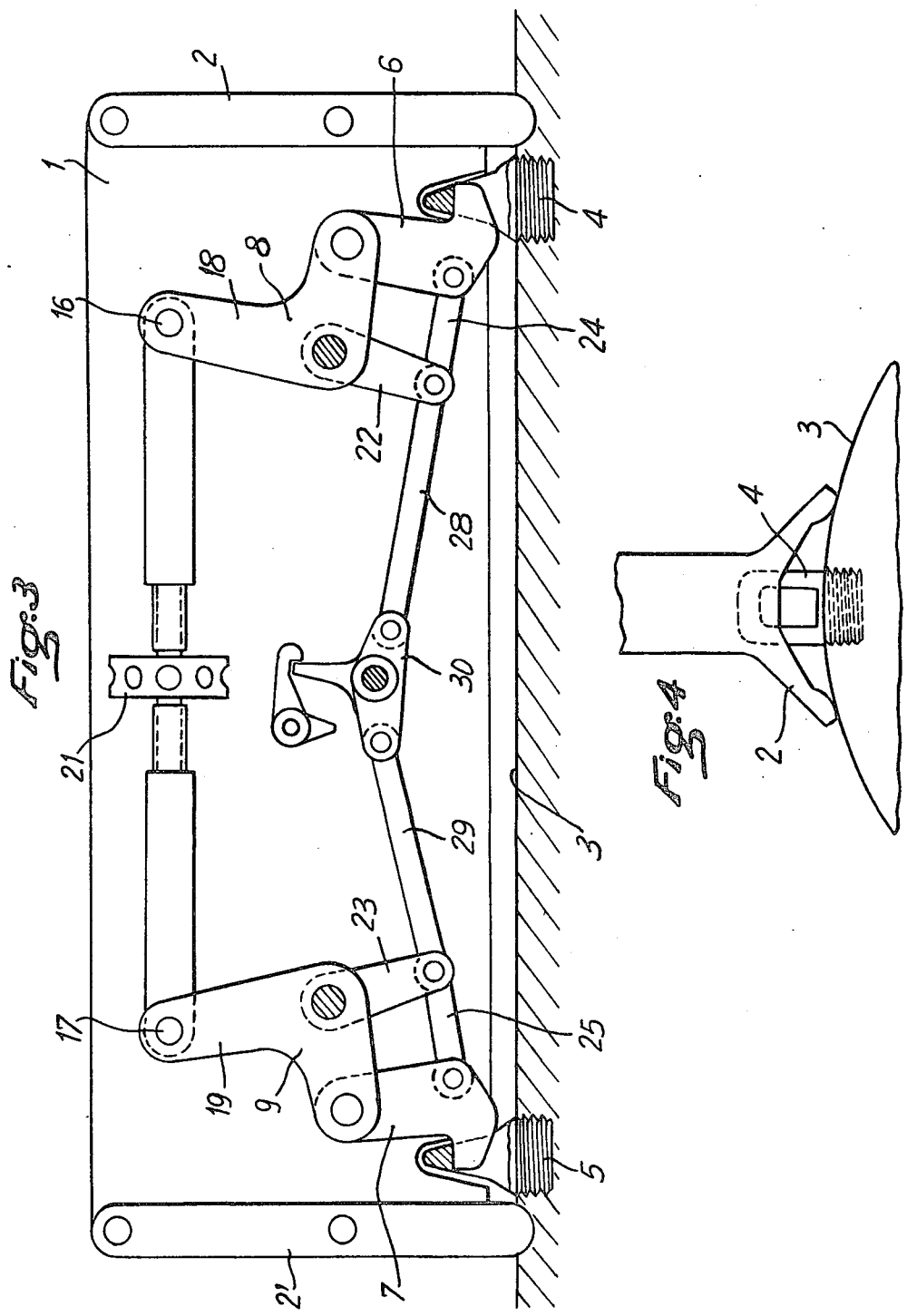

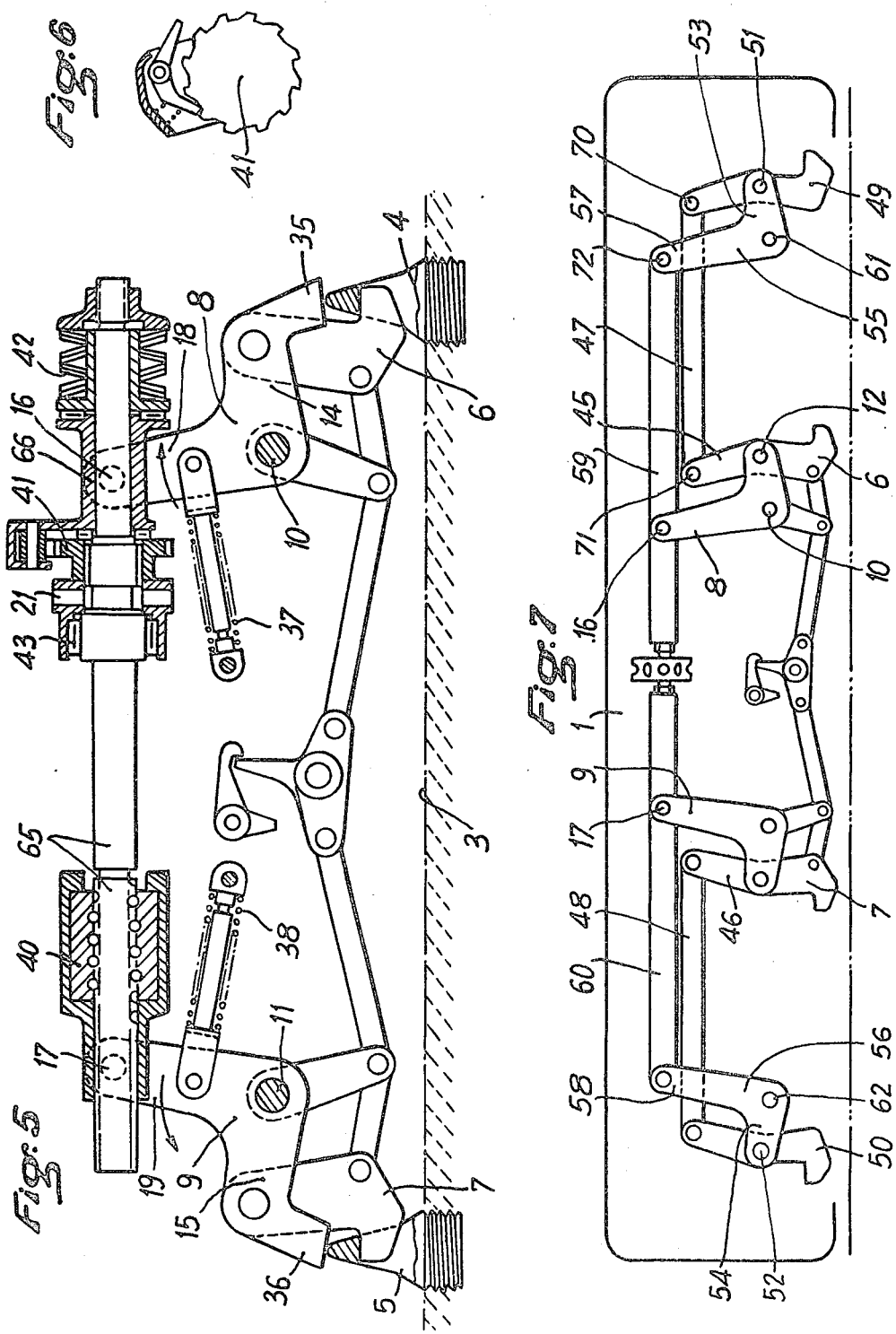

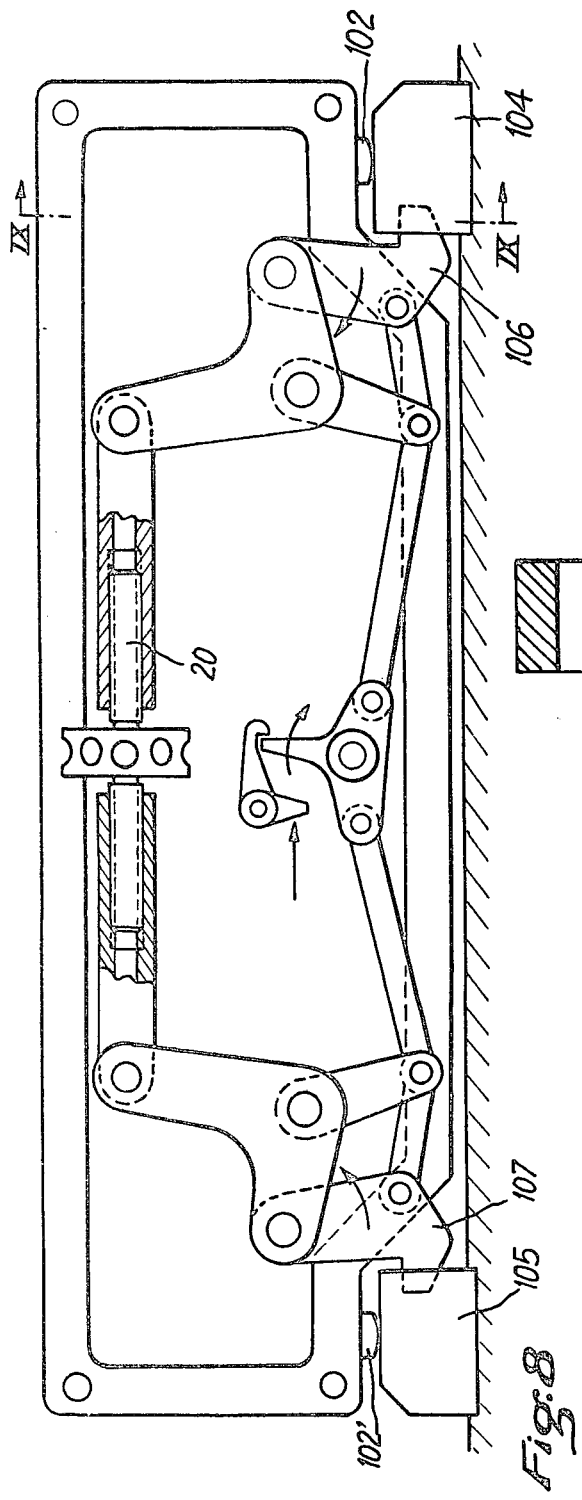
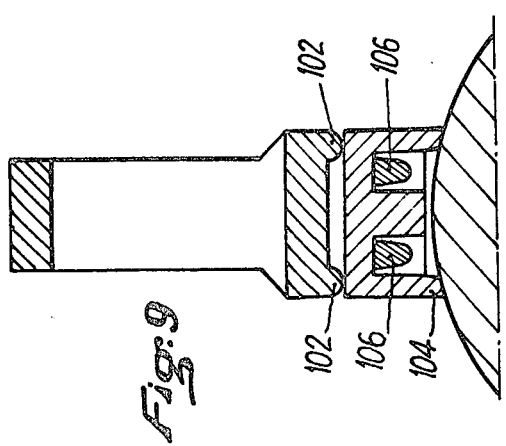
Fig. 8
Fig. 9

DEVICE FOR LOCKING TO FIXED SUPPORTS LOADS CARRIED UNDER AIRCRAFT

BACKGROUND OF THE INVENTION

1. Field of the Invention

This invention relates in general to means for locking or wedging loads carried under aircraft in relation to fixed supports.

2. Description of the Prior Art

As a rule, loads transported under aircraft have a substantially cylindrical shape and comprise tapped holes or wells located along a same generatrix on the load and at a standard relative spacing or distance between centres. These tapped holes are engageable by standard rings provided with a screw-threaded extension and may also be utilized for securing so-called "saddle" suspension members. In rings of this character it is also known to engage and lock matching hooks provided in the suspension or like device of the aircraft. To complete the proper positioning of the load and lock same in position, various means have been proposed up to now. One of them consists in bringing the load to a position of engagement with fixed supports rigid with the carrier device or the aircraft structure, by performing a complementary upward movement of the complete suspension and hooking device (releaser or ejector).

SUMMARY OF THE INVENTION

The device constituting the subject-matter of the present invention is also based on the same load locking or wedging method, however with the difference that given equal forces exerted on the suspension hooks the forces generated in the load-releasing gearing-down mechanism remain unchanged, irrespective of the vertical positions in which the hooks have been moved for locking the load. In the specific case of ring-supported load, these positions are subordinate to the load diameter and also to the more or less deep screwing of the ring screws in the tapped holes or wells.

On the other hand, this device is characterized in that the complementary upward movements of the two hooks are obtained by means of common control member requiring only one access thereto. This simultaneously control obtained for example with the assistance of an ordinary stretching-device or screw, is such that the efforts resulting from the prestress exerted on the hooks are equally distributed.

BRIEF DESCRIPTION OF THE DRAWINGS

FIG. 1 is a diagrammatic longitudinal section showing the suspension device for a ring-type load in its locked condition, with the hooks in their upper position.

FIG. 2 is a fragmentary end view showing the corresponding portion of the load engaging the supports or bearing elements. P FIG. 3 illustrates the same section as FIG. 1 but with the hooks in their lower position.

FIG. 4 is a view similar to FIG. 2 showing the corresponding position of a load of greater diameter engaging the same support or bearing elements.

FIG. 5 shows a modified embodiment of the means for simultaneously controlling the hooks, with a quick approach device.

FIG. 6 is a part-sectional transverse view of a detail of the device shown in FIG. 5.

FIG. 7 illustrates a device based on the same principle but capable of transporting load comprising suspension rings or saddles disposed at two different distances between centres.

FIG. 8 illustrates a device similar to the device of FIG. 1 but designed for locking loads provided with saddles and adapted to be locked by causing the saddles to engage fixed bearing points, and FIG. 9 is a vertical section taken along the line IX—IX of FIG. 8.

DESCRIPTION OF THE PREFERRED EMBODIMENTS

Referring first to FIGS. 1 and 3 of the drawings, the reference numeral 1 designates diagrammatically the contour of the hooking or suspension device of the aircraft, 2 and 2' being the fixed bearing members, 3 being the upper part of the load, 4 and 5 the screw rings equipping the load, and 6, 7 the suspension or supporting hooks engaging the screw rings 4 and 5, respectively, 8 and 9 designating a pair of bell-crank levers pivoted to fixed pins 10 and 11 rigid with the suspension device 1. The suspension hooks 6 and 7 are pivoted by means of pins 12 and 13 to the outer ends of arms 14 and 15 of bell-crank levers 8 and 9, respectively. The outer ends of the arms 18 and 19 of levers 8 and 9 are interconnected at 16 and 17 by a conventional screw-type stretching device 20 adapted to be actuated by means of a cylindrical member 21 provided with radial holes engageable by a screwdriver, rod or other tool.

However, this control action may also be exerted by means of a conventional spanner engaging a hexagonal contour of member 21, or alternatively by means of a worm and wheel device.

Also pivoted to the fixed pins 10 and 11 are two connecting links 22 and 23 connected in turn via links 24, 25 to the pair of hooks 6 and 7, respectively, said links 24 and 25 being pivoted to links 22, 23 at 26, 27 and to hooks 6, 7 at 26', 27' as shown. Pivoted to the ends 26 and 27 of links 22, 23 are connecting-rods 28, 29 connected in turn to a rocker 30. According to a well-known arrangement, the geometrical axis of these connecting-rods 28, 29 is relatively close to the pivot axis 31 of rocker 30 so as to produce a considerable effort demultiplication or gearing-down, to prevent the hooks 6 and 7 from opening by means of a simple detent-positioning device such as 32 which is no part of the present invention.

In FIG. 5, the component elements of the device having the same function as in FIGS. 1 and 3 are designated by the same reference numerals. The ends of arms 14 and 15 of bell-crank levers 8 and 9 have heel extensions 35 and 36 and the arms 18 and 19 of the same levers are urged in the direction of the arrows by the force of springs 37 and 38. The screw-type stretching device 20 is replaced by a reversible screw and nut device of the satellite ball or roller type 40. The irreversibility is obtained by means of a pawl and ratchet device 41. A calibrated spring 42 limits the stress of the assembly to a preselected value. The device is tensioned for example by means of a cylindrical control member 21 provided with radial holes, as in the embodiment shown in FIGS. 1 and 3, so that the ratchet wheel 41 can be driven; this cylindrical control member 21 revolves in a ball or needle bearing 43 in order to improve the efficiency of the device.

In FIG. 7 the hooks 6 and 7 located at a relatively short distance from each other are linked in the same way as in FIGS. 1 and 3 but comprise extensions 45 and 46 having pivoted to their outer ends corresponding links 47, 48 so as to connect the hooks 6, 7 to corresponding or similar hooks 49 and 50 having a greater distance between centers than hooks 6 and 7. These hooks 49 and 50 are pivoted at 51 and 52 to the ends of arms 53 and 54 of levers 55 and 56 having their opposite arms 57, 58 connected via links 59 and 60 to said levers 8 and 9, the latter being connected at 16 and 17, respectively, to said links 59 and 60, as shown. The levers 55 and 56 are fulcrumed like the first pair of levers 8 and 9 about fixed pivot pins 61 and 62 rigid with the suspension system 1. The link 47 is pivoted at 70 and 71, respectively, to hooks 49 and 6, and the other link 59 is pivoted at 72 to lever 55.

Now the mode of operation of the device will be described with reference to FIGS. 1 and 3 of the drawings. Firstly, it will be seen that the forces exerted by rings 4 and 5 on the corresponding hooks 6 and 7 constantly urge these hooks for rotation about the axis 12 and 13 in the direction of the arrows of FIG. 1. Therefore, the links 28 and 29 are constantly compression stressed, thus causing the rocker 30 to abut the detent-positioning device 32; under these conditions, both links 22 and 23 pivoted to the fixed pins 10 and 11 are held against movement and the links 28 and 29 are held in a fixed position. On the other hand, the upward movement of hooks 6 and 7, resulting from the deformation, about the axes of pins 10 and 11, of the parallelograms associated with each hook, which are for one of said hooks the points 10, 12, 26 and 26', and for the other hook the points 11, 13, 27 and 27', is substantially vertical. The force exerted on the hooks 6 and 7 by rings 4 and 5, in relation to the pivot pins 10 and 11, is thus constant irrespective of the hook height. The constant resistant moment balancing the first moment and counteracting the pivotal movement of said hooks about the axes of pins 10 and 11 is proportional to the compression stress exerted on links 28 and 29 and also to the distance between centres of these links and the fixed pivot axes 10 and 11. Since the position of links 28 and 29 is fixed, their distance to the axes of pins 10 and 11 is constant, and as a result the compression stress is also constant, irrespective of the hook height.

This upward stroke of hooks 6 and 7 is obtained by actuating the stretching device 20 in the direction to move the pivot pins 16 and 17 towards each other. The levers 8 and 9 pivot about their fulcri 10, 11 and carry along via their arms 14 and 15 and pivot pins 12 and 13 the hooks 6 and 7 upwardly. The reverse operation is of course also possible.

It will also be seen that since there is no other connection between the stretching device 20 and the pivot pins 16 and 17, the action exerted by this stretching device 20 on one of levers 8 or 9, for instance lever 8, is necessarily balanced by an equal reaction of lever 9, and vice versa. Consequently, the efforts exerted on the hooks are constantly equal. Obviously, the action exerted by the stretching device 20 on levers 8 and 9, and therefore on hooks 6 and 7, is simultaneous, and besides this centralized control action requires only one local access.

Due to the necessity of making the load device irreversible the stretching device 20 comprises fine-pitch, likewise irreversible threads. As a result, the cylindrical member 21 comprising the radial holes must be rotated through a relatively great number of revolutions for obtaining an appreciable movement of hooks 6 and 7. In order to facilitate this operation while reducing the time necessary for performing the locking action, it is proposed to replace the standard screw stretching device 20 with a reversible screw and nut device 40 such as the one illustrated in FIG. 5. The reversibility is obtained according to a known method, by ball circulation or using planet rollers, so that the nut can be rotated on the screw or vice versa, by exerting a simple axial thrust. A ratchet wheel 41 permits the rotation of the device in one direction and prevents this rotation in the other direction, unless an external action is exerted on the pawl proper. Since the number of teeth of the ratchet wheel 41 is necessarily limited, it may happen that the locking action is not sufficient after the passage of a tooth under the pawl, and that the passage of the next tooth is not possible or exceeds the permissible value. To palliate this inconvenience, it is possible to use either several ratchet wheels on a same shaft so as to multiply the number of teeth without inconvenience, or a so-called "autolock" wedging device. The preferred solution consists in providing a prestressed spring 42 calibrated to a predetermined value, the resiliency of this spring permitting the passage of the ratchet wheel from one tooth to another without producing any sudden increment in the prestress.

The hook lifting manoeuver is accomplished as in the preceding case by means of a perforated cylindrical member 21 which, for the high-efficiency reasons given hereinabove, is mounted on a ball or needle bearing 43. The rotation of this cylindrical member 21 is attended by the rotation of the screw 65 in the direction to screw same in the nut 40 which corresponds to the "free wheel" action of the teeth of ratchet wheel 41 rigid with screw 65. This movement is attended by a movement of pivot pins 16 and 17 toward each other, as in the preceding case, the first pivot pin 16 being rigid with the socket 66 driven via the spring 42 as a consequence of the axial movement of said screw 65 while the second pivot 17 is rigid with the nut 40.

This method departs from the preceding one by the possibility of performing an approach. Now this approach takes place automatically and is started at the end of the hoisting of the load 3 by the action exerted by its rings 4 and 5 on the pair of levers 8 and 9. The top of rings 4, 5 abutting the heels 35 and 36 of bell-crank levers 8, 9 cause the latter to rotate about their pivot pins 10, 11 in the direction opposite to the arrows. This rotation and the resultant lifting of hooks 6, 7 are permitted by the reversibility of nut 40 of which the axial movement of translation is attended by the rotation of the screw 65 in the direction permitted by the ratchet wheel 41. When the load eventually abuts the supports or bearing points, it is only necessary to complete the locking action by rotating to a moderate extent the radially perforated cylinder 21 in order to produce the desired degree of prestress.

Relatively light-weight loads are also employed wherein the distance between centres of the suspension rings 4, 5 has a minimum value, in contrast to heavier loads having a greater distance between the centres of the suspension rings, both distances being standardized. Certain load-carrying devices must be capable of accommodating both types of loads and to this end they comprise hooks disposed at the two standard distances between centres. Therefore, the present invention also comprises an arrangment based on the principle of the device described hereinabove for carrying both types of loads. FIG. 7 illustrates diagrammatically this arrangement already described at least partially in the foregoing. It is clear that when the pair of central hooks 6, 7 are used, the device operates exactly as the one described hereinabove. The outermost hooks 49, 50 and the corresponding levers 55 and 56 supporting these hooks are connected to the central hooks 6, 7 and levers 8, 9 by means of links 47, 48, on the one hand, and 59, 60 on the other hand. This linkage system constitutes a double parallel-motion having two sets of vertices, namely 51, 70, 71 and 12 for hooks 49, and 6, and 61, 72, 16 and 10 for levers 55 and 8. On the left-hand portion of the device, which is symmetrical in relation to the right-hand portion, identical parallel-motion systems are shown. Therefore, all the movements and efforts concerning the hooks 49 and 50 transmitted integrally to hooks 6 and 7 from which the above-described device operates exactly as in the case of a system comprising only two hooks.

FIGS. 8 and 9 of the drawing illustrate the application of the principle of this invention to the locking of loads equipped with saddles. In this case, the locking action against bearing points is obtained by means of saddles in lieu of rings, so that the complementary movement required for producing this locking action is particularly reduced; however, the stress distribution among the hooks and the centralized control by means of a stretching device are still the essential characteristic features of the device.

FIG. 8 illustrates the same component elements as FIG. 1 with the difference that the rings 4 and 5 are replaced by so-called saddles 104 and 105, that the single hooks 6 and 7 are replaced by double-beak hooks 106 and 107, and that the fixed bearing points 2 and 2' which engaged the load directly in the preceding cases are replaced by bearing studs 102 and 102' engaging the top surface of members 104 and 105.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What we claim is:

1. In a suspension device for carrying a load under an aircraft comprising a pair of pivoting suspension hooks adapted to engage suspension members disposed at the upper part of the load and fixed supports adapted to be engaged by the load to wedge same, a device for locking said load which comprises:

a pair of bell-crank levers each pivoted to a fixed point of the suspension device, each one of said suspension hooks being pivoted at a first arm of one of said bell-crank levers, a screw-type stretching device having an end pivoted to a second arm of one bell-crank lever of said pair of bell-crank levers and an opposite end pivoted to a second arm of the other bell-crank lever of said pair of bell-crank levers, a pair of connecting links each pivoted at one end about the fixed pivot point of one of said bell-crank levers, a link pivotally connecting each suspension hook to the corresponding connecting link, so as to constitute a parallel motion with the suspension hook, the first arm of the bell-crank lever and the connecting link, a pair of connecting rods, each connecting rod connecting the connecting link associated to one suspension hook to one end of a central rocker, and a detent positioning device preventing said rocker to pivot in a direction allowing a pivotal opening movement of the suspension hooks, so that by action on said stretching device is obtained a simultaneous, substantially rectilinear upward movement of translation of each suspension hook causing the load to engage said suspension members while the efforts exerted on each hook are equally distributed.

2. Device according to claim 1, wherein said first arm of each bell-crank lever comprises an extension adapted to be engaged by the load, said stretching device comprising a reversible screw and nut mechanism and a pawl and ratchet mechanism whereby, when suspending the load to the suspension hooks, said load engages the extensions of the bell-crank levers thus causing a pivoting thereof which automatically ensure a quick upward movement of translation of the suspension hooks.

3. Device according to claim 1 or to claim 2, wherein each one of the suspension hooks and one of the bell-crank levers associated therewith are operatively connected to another hook and another bell-crank lever by means of a linkage constituting parallel-motion means, whereby loads having suspension rings located at two different distances between centres can be suspended by means of the same device.

* * * * *